US009992172B2

(12) United States Patent
Winter et al.

(10) Patent No.: US 9,992,172 B2
(45) Date of Patent: Jun. 5, 2018

(54) SECURE KEY MANAGEMENT IN A DATA STORAGE SYSTEM

(71) Applicant: Microsoft Technology Licensing, LLC, Redmond, WA (US)

(72) Inventors: Dan Winter, Redmond, WA (US); David C. Oliver, Bellevue, WA (US); Jeffrey L. McDowell, Redmond, WA (US); Zejian Wang, Kirkland, WA (US); Parul Manek, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 233 days.

(21) Appl. No.: 14/855,268

(22) Filed: Sep. 15, 2015

(65) Prior Publication Data

US 2016/0323250 A1 Nov. 3, 2016

Related U.S. Application Data

(60) Provisional application No. 62/156,099, filed on May 1, 2015.

(51) Int. Cl.
*H04L 29/06* (2006.01)
*H04W 12/04* (2009.01)
(Continued)

(52) U.S. Cl.
CPC ........ *H04L 63/0428* (2013.01); *H04L 9/0822* (2013.01); *H04L 9/0891* (2013.01);
(Continued)

(58) Field of Classification Search
CPC ........... H04L 63/0428; H04L 2463/062; H04L 9/0891; H04L 9/0822; H04L 63/062; H04W 12/02; H04W 12/04
(Continued)

(56) References Cited

U.S. PATENT DOCUMENTS 5,673,316 A 9/1997 Auerbach et al.
7,860,486 B2 12/2010 Frank
(Continued)

OTHER PUBLICATIONS

Second Written Opinion for International Patent Application No. PCT/US2016/029906, dated Dec. 9, 2016, date of filing: Apr. 29, 2016, 6 pages.
(Continued)

*Primary Examiner* — Baotran N To
(74) *Attorney, Agent, or Firm* — Christopher R. Christenson; Kelly, Holt & Christenson, PLLC

(57) ABSTRACT

A system for remotely storing data includes a communication component that is configured to receive a data file to be stored on a remote data storage system. An encryption system is configured to obtain at least one key and encrypt the data file with the at least one key. A processor is configured to generate a request to a master key storage system through the communication component to operatively encrypt the at least one key using a master key stored in the master key storage system. The communication component is configured to transmit the encrypted data file to at least one remote storage location. The processor is configured to receive the encrypted key(s) from the master key storage system and store the encrypted key(s) in a data store.

17 Claims, 9 Drawing Sheets

(51) Int. Cl.
*H04L 9/08* (2006.01)
*H04W 12/02* (2009.01)

(52) U.S. Cl.
CPC ........... *H04L 63/062* (2013.01); *H04W 12/04* (2013.01); *H04L 2463/062* (2013.01); *H04W 12/02* (2013.01)

(58) Field of Classification Search
USPC .......................................................... 713/168
See application file for complete search history.

(56) References Cited

U.S. PATENT DOCUMENTS

| | | | |
|---|---|---|---|
| 8,675,875 B2 | 3/2014 | Yellepeddy et al. | |
| 8,782,441 B1 | 7/2014 | Osterwalder et al. | |
| 8,855,318 B1 | 10/2014 | Patnala et al. | |
| 8,863,299 B2 | 10/2014 | Sharma et al. | |
| 2010/0299313 A1 | 11/2010 | Orsini et al. | |
| 2012/0284506 A1* | 11/2012 | Kravitz | G06Q 40/00 713/151 |
| 2013/0042106 A1* | 2/2013 | Persaud | G06F 21/606 713/165 |
| 2014/0059352 A1* | 2/2014 | Haga | H04L 9/0822 713/171 |
| 2014/0093084 A1 | 4/2014 | De Atley et al. | |
| 2014/0181517 A1* | 6/2014 | Alaranta | H04L 63/062 713/168 |
| 2015/0039889 A1 | 2/2015 | Andoni | |

OTHER PUBLICATIONS

International Preliminary Report on Patentability for International Patent Application No. PCT/US2016/029906, dated Mar. 16, 2017, date of filing: Apr. 29, 2016, 7 pages.

Shah, Shon, "Stay up to Date on Security and Compliance in AWS", Published on: Nov. 6, 2014, Available at: http://blogs.aws.amazon.com/security/post/Tx1JNNFZQ3IWY5K/Benefits-of-a-Key-Hierarchy-with-a-Master-Key-Part-Two-of-the-AWS-CloudHSM-Serie.

"Amazon Web Services: Overview of Security Processes", In Whitepaper, Jun. 2014, 68 pages.

Brodkin, Jon, "Box Hands Cloud Encryption Keys Over to Its Customers", Published on: Feb. 10, 2015, Available at: http://arstechnica.com/information-technology/2015/02/box-hands-cloud-encryption-keys-over-to-its-customers/.

"Database Advanced Security Administrator's Guide", Published on: Nov. 16, 2011, Available at: http://docs.oracle.com/cd/B28359_01 /network.111/b28530/asotrans.htm#BABJJAIG.

Puzio, et al., "ClouDedup: Secure Deduplication with Encrypted Data for Cloud Storage", In Proceedings of the 5th IEEE International Conference on Cloud Computing Technology and Science, Dec. 3, 2013. 8 pages.

"How to Generate and Transfer HSM-Protected Keys for Azure Key Vault", Published on: Apr. 1, 2015, Available at: https://msdn.microsoft.com/en-us/library/azure/dn903624.aspx.

"Amazon CloudHSM Aims to Ease Security Worries", Retrieved on: May 12, 2015, Available at: http://www.informationweek.com/cloud/infrastructure-as-a-service/amazon-cloudhsm-aims-to-ease-security-worries/d/d-id/1109270?.

"Data at Rest Encryption", Published on: Apr. 17, 2014, Available at: http://www.safenet-inc.com/data-encryption/data-at-rest-encryption/.

"Microsoft Matches Amazon With Cloud Crypto Key Storage", Published on: Jan. 1, 2015, Available at: Http://www.informationweek.com/cloud/infrastructure-as-a-service/microsoft-matches-amazon-with-cloud-crypto-key-storage/d/d-id/1318548.

"WatchDox Security Architecture", Retrieved on: May 12, 2015, Available at: https://www.watchdox.com/us/product/security/.

"International Search Report and Written Opinion Issued in PCT Application No. PCT/US2016/029906", dated Jun. 22, 2016, 11 Pages.

Menezes, et al., "Handbook of Applied Cryptography", CRC Press Publishers, Oct. 16, 1996, pp. 543-590.

* cited by examiner

SECURE KEY MANAGEMENT IN A DATA STORAGE SYSTEM

CROSS-REFERENCE TO RELATED APPLICATION

The present application is based on and claims the benefit of U.S. provisional patent application Ser. No. 62/156,099 filed May 1, 2015, the content of which is hereby incorporated by reference in its entirety.

BACKGROUND

Computer systems are currently in wide use. Some computer systems use remotely located services to accomplish a variety of different things. The remotely located services, for instance, can provide remote data storage for a client.

A cloud service provider that provides such a service generally stores customer data remotely from the premises of the customer and provides one or more services relative to the data. Examples of such cloud services include remote file storage and sharing, electronic mail, hosted applications, etc.

For many customers of the cloud services, such as corporations or other organizations, sensitive and/or confidential information may be stored remotely from the corporation's physical facility. Thus, for some customers of the cloud service, it is important that access to any of the customer's data be strictly controlled. For instance, it may be that customers of cloud services wish to have visibility into actions taken on their content, and wish to have control over access to their content in the cloud, in order to trust the cloud service provider.

The discussion above is merely provided for general background information and is not intended to be used as an aid in determining the scope of the claimed subject matter.

SUMMARY

A system for remotely storing data includes a communication component that is configured to receive a data file to be stored on a remote data storage system. An encryption system is configured to obtain at least one key and encrypt the data file with the at least one key. A processor is configured to generate a request to a master key storage system through the communication component to operatively encrypt the at least one key using a master key stored in the master key storage system. The communication component is configured to transmit the encrypted data file to at least one remote storage location. The processor is configured to receive the encrypted key(s) from the master key storage system and store the encrypted key(s) in a data store.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Data security in a cloud service is an important component to earning and maintaining customer trust. One particular vulnerability of customer data is to the compromise of the physical server or servers that store the customer's data. For example, if unauthorized access occurs to the server, or if the server itself is stolen or otherwise seized, it is important that the customer's data not be rendered vulnerable to unauthorized access. For example, a company that is hosting data with a third party (for example a cloud storage provider) can safely destroy access to the data they have entrusted to the third party. This may become necessary if a company believes their data is going to be illegally seized.

In accordance with one embodiment described herein, data security is accomplished safely by encrypting blobs (file data) with unique keys and then encrypting those keys before persisting such keys anywhere. Depending on scale considerations, those keys may subsequently be encrypted again creating key hierarchies such that minimal keys may need to be 'rolled' given certain operational events. At some point the end of the key chain will be reached—which is where a Hardware Security Module is used to lock/unlock the final key used for encryption. A Hardware Security Module is a purpose-built device that provides significant (both logical and physical) protection for cryptographic key material. Some HSMs are designed for FIPS validation. FIPS validation is described in Federal Information Processing Standard (FIPS). This is a U.S. government computer security standard that is used for accreditation of cryptographic modules.

In one embodiment, the HSM is loaded with a customer key (either physically or by trusted proxy) such that the third party that holds the customer's data never actually has access to the customer's data. The third party (i.e. cloud storage provider) can then request that the HSM decrypt the last key in the keychain for a given piece of data which unlocks the third party to fully decrypt the data (typically on behalf of the customer's request).

Figure 1:
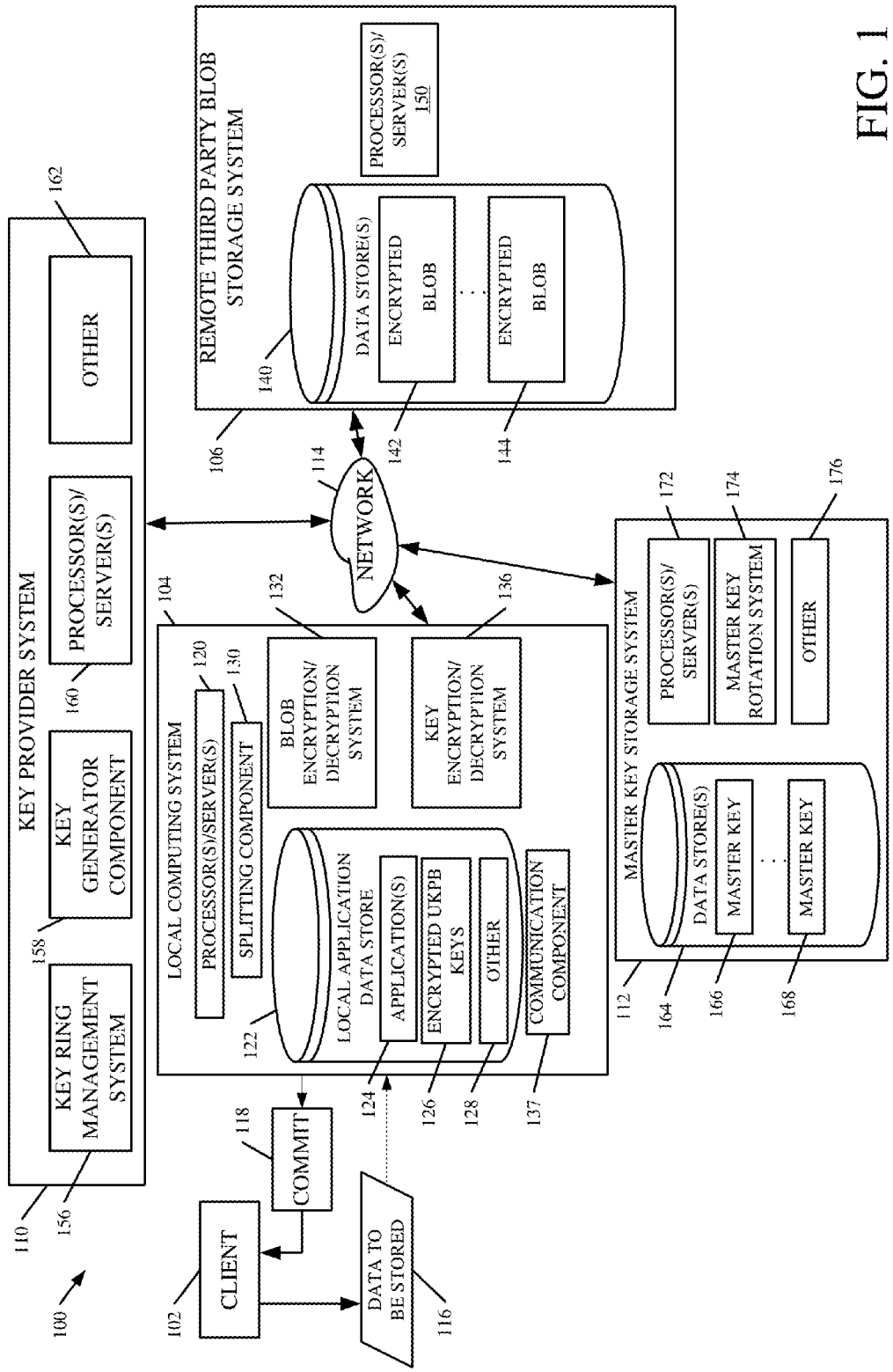
FIG. 1 is a block diagram of one example of a data storage architecture with which embodiments described herein are useful.

FIG. 1 is a block diagram of one example of a data storage architecture with which embodiments described herein are useful. Architecture 100 illustratively includes one or more clients 102 that interact with local computing system 104. They can interact with systems 104 in order to store information on a remote third party blob storage system 106.

FIG. 1 also shows that, in one example, architecture 100 includes a key provider system 110 and a master key storage system 112. In one embodiment, master key storage system 112 includes an HSM, that can be deployed on the customer's premises or remotely therefrom. Systems 104, 106, 110, and 112 illustratively communicate with one another over a network 114.

In one example, client 102 can provide a data stream (e.g., a file) 116 to local computing system 104 which prepares it for storage on system 106, and provides it to system 106 for storage. Local computing system 104 also validates that the file 116 has been accurately written to system 106 and then provides a commit response 118 to client 102 indicating that the write has been successful. In doing so, it can use key provider system 110 and master key storage system 112, among other things.

In the example shown in FIG. 1, local computing system 104 illustratively includes a set of processors or servers 120, and a local application data store 122 that stores applications 124, a set of encrypted unique key per blob (UKPB) keys 126 and it can store other items 128. System 104 also illustratively includes blob splitting component 130, per blob encryption/decryption system 132, key encryption/decryption system 136, communication component 137, and it can include a variety of other items as well. Communication component allows system 104 to communicate over network 114 any may include any suitable hardware components to enable and/or facilitate such communication. Examples of such hardware include an Ethernet physical layer and associated port(s). FIG. 1 also shows that, in one example, remote third party blob storage system 106 illustratively includes one or more data stores 140 that store a set of encrypted blobs 142-144, and that can include other items as well. In one example, each blob has a plurality of blob portions where each blob portion is encrypted with a different encryption key and stored in a different data store 140. System 106 also illustratively includes one or more processors and servers 150 and it can include other items as well.

In addition, FIG. 1 also shows that, in one example, key provider system 110 includes key ring management system 156, key generator component 158, one or more processors or servers 160, and it can include other items 162. Master key storage system 112 illustratively includes one or more data stores 164 that store a set of master keys 166-168, and that can store other items too. System 112 also includes one or more processors or servers 172, master key rotation system 174, and it can include other items 176.

Before describing the overall operation of architecture 100, a brief overview of its operation, and some of the items in architecture 100, will first be provided. When local computing system 104 receives data 116 from client 102, for storage on system 106, blob splitting component 130 splits or otherwise breaks the file into a plurality of different blob portions. Per blob encryption/decryption system 132 obtains an encryption key and encrypts each blob portion with its own encryption key. In one example, encryption/decryption system 132 may obtain each key from a key generator component 158 in key provider system 110. In another example, however, encryption/decryption system 132 may call a local service to generate a random key for encrypting each blob portion. Thus, embodiments described herein can be practiced with the per blob portion keys being generated by any suitable service or module, either local or remote.

System 104 then sends the encrypted blob to system 106 for storage. System 106 writes the encrypted blob to one or more data stores 140. If the write is successful, system 104 can provide commit 118 back to client 102.

Key encryption/decryption system 136 also illustratively interacts with master key storage system 112 to encrypt the UKPB keys used to encrypt the blobs sent to system 106 for storage. The encrypted UKPB keys 126 are then stored on local application data store 122. In accordance with one embodiment, the keys used to encrypt the blob portions are encrypted before they are persisted anywhere. Depending on scale considerations, those keys may be encrypted again, such as with an intermediate level key in order to generate a key hierarchy. Ultimately, all keys (UKPB keys as well as any intermediate level keys) are related to and require a decryption by the master key held in master key storage system 112. Additionally, in embodiments where master key storage system 112 includes an HSM, any/all cryptographic may be performed within the HSM, which may then return the cryptographic results to the requester.

In one example, systems 104, 106, and 112 are all in separate physical and geographic locations. Therefore, for a surreptitious user to obtain an unencrypted copy of any files 116 that are stored on storage system 106, that user must have access not only to the encrypted UKPB keys 126 on system 104, but the user must also have access to the master keys on master key storage system 112, and to the encrypted blob portions themselves, which are stored on storage system 106. Thus, the surreptitious user must have access to three different systems, and a knowledge of how to use the master key, encrypted UKPB keys and encrypted blob, in order to gain access to an unencrypted form of the data.

Figure 2:
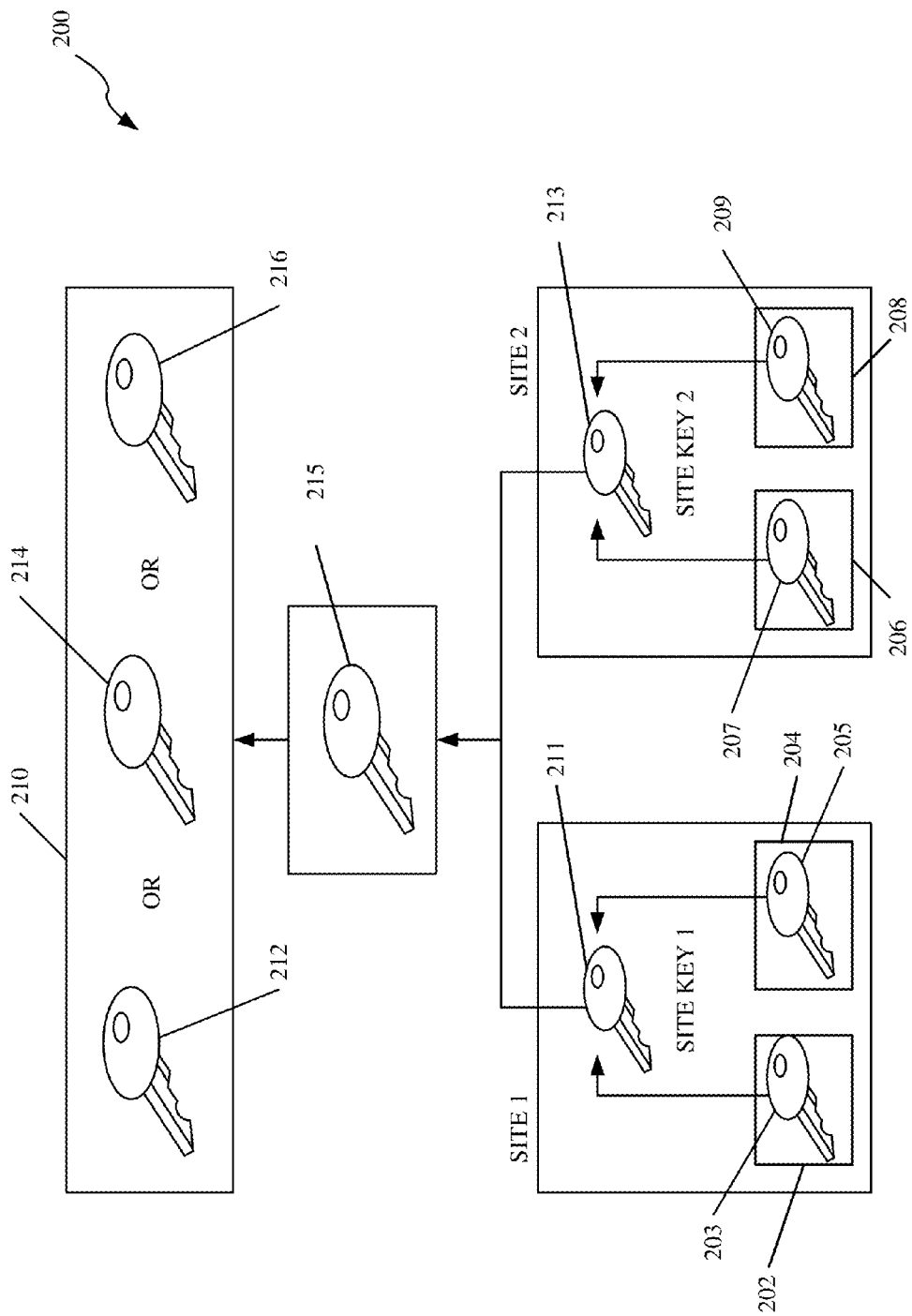
FIG. 2 is a diagrammatic view of a key hierarchy in accordance with an embodiment.

FIG. 2 is a diagrammatic view of a key hierarchy in accordance with an embodiment. A shown, key hierarchy 200 illustrates a blob (binary large object) that is broken into four distinct blob portions 202, 204, 206, 208. Each blob portion is encrypted with a unique key. Specifically, blob portion 202 is encrypted with Unique Blob Key 203; blob portion 204 is encrypted with Unique Blob Key 205; blob portion 206 is encrypted with Unique Blob Key 207; and blob portion 208 is encrypted with Unique Blob Key 209. In the example shown, the encryption is in accordance with Automatic Encryption Standard (AES) 256 encryption. However, embodiments disclosed herein can be practiced with other suitable encryption technologies and protocols as long as suitable data security and performance is provided. As shown in the hierarchy, access to unique keys, in one embodiment, is available via parent keys, such as Site Key 1 (211) for Unique Blob Keys 203 and 205 and Site Key 2 (213) for Unique Blob Keys 207 and 209. Site Key 1 can be used to encrypt/decrypt all Unique Blob Keys within Site 1 and Site Key 2 can be used to encrypt/decrypt all Unique Blob Keys for Site 2.

As can be appreciated, any number of sites can be used. In one embodiment, all such Site Keys are encrypted by a Farm Key, such as Farm key 215 that encrypts/decrypts all keys for a particular server farm. In examples where multiple farms are used, a plurality of such Farm Keys can be employed. At the top of the key hierarchy, a single master key is used. The master key 210 may be provided by the tenant or customer for all customer or tenant content, as shown at reference numeral 212; master key 210 may be provided by a tenant or customer for a group of tenant or customer sites as shown at reference numeral 214; or master key 210 may be provided by a tenant or customer for a single tenant or customer site, as shown at reference numeral 216. The master key, in one embodiment, is encrypted in accordance with AES 256 and stored within an HSM, either on the tenant's premises or remotely therefrom. However, in embodiments there the HSM is stored remotely from the tenant's premises, the HSM is still located in a different place than remote third party blob storage system 106. In the example shown in FIG. 2, all keys, except for the master key, may be generated by the system in response to the occurrence of certain events, such as a file storage request.

Figure 3:
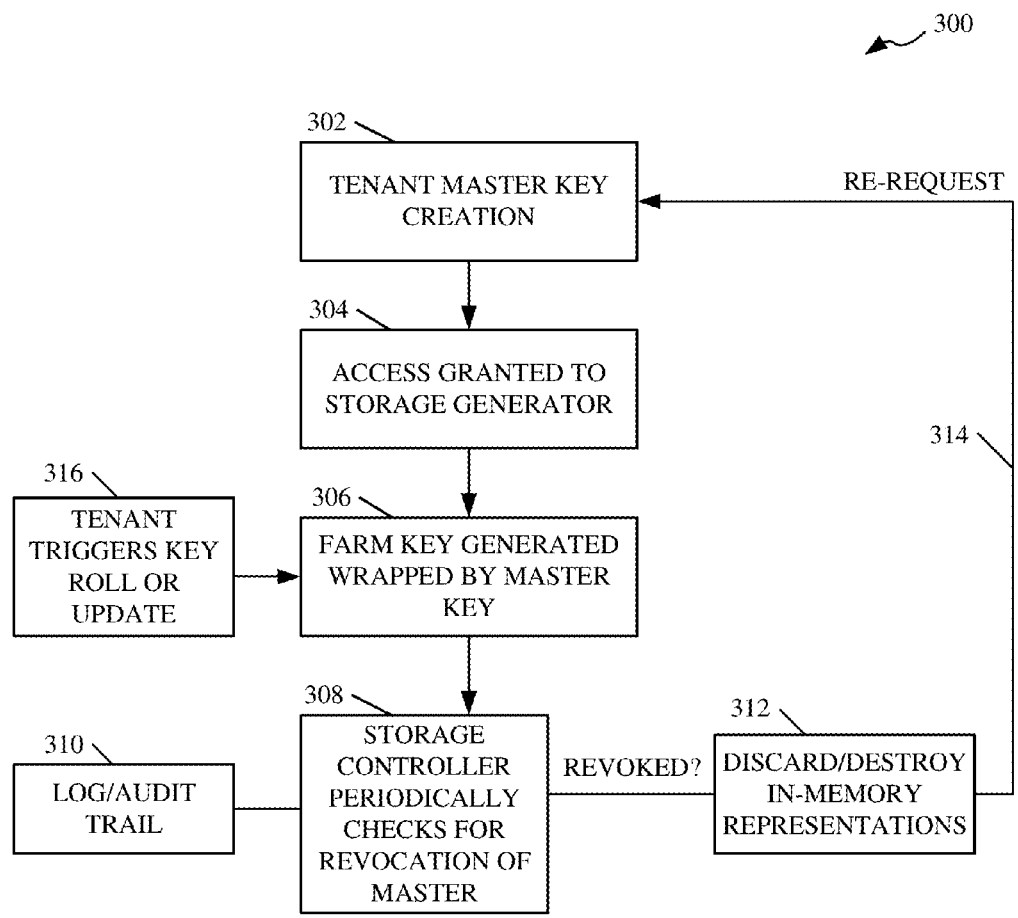
FIG. 3 is a flow diagram of a method of securely managing keys for a data storage system in accordance with one embodiment.

FIG. 3 is a flow diagram of a method of securely managing keys for a data storage system in accordance with one embodiment. Method 300 begins at block 302 where a tenant master key is generated. This master key is generated by the tenant or customer and is provided to a master key storage system 112, which may include an HSM. Once the initial master key has been generated, access to the master key storage system is granted to the storage controller, such as system 104 (shown in FIG. 1), as indicated at block 304. When the storage controller receives access to the master key in master key storage system 112, a farm key is generated by the storage controller and then wrapped by the tenant master key. The wrapped farm key is then stored by the storage controller in suitable location, such as key provider system 110 or data store 122, as indicated at block 306. With the farm key generated and wrapped in the tenant key, the storage controller is ready to process storage requests. However, as indicated at block 308, the storage controller will periodically check with master key storage system 112 to determine whether the storage controller is still authorized to use the master key. In one embodiment, such checking is logged in order to generate an audit trail, as indicated at block 310. However, embodiments can be practiced with other forms of providing transparency to the periodic checking process for the tenant. This is a useful feature in that it provides the tenant with reassurances that should the tenant disable access to the master key storage system for the storage controller, that the storage controller would, in fact, determine that such access was revoked. In the event that access to the master key is revoked or the master key is changed in any way by the tenant, method 300 will proceed to block 312 where the storage controller will discard any in-memory representation of any keys that the HSM in the master key storage system 112 has decrypted. When such process is complete, the storage controller will request the master key from master key storage system 112, as indicated by line 314. Accordingly, the interaction between the storage controller and master key storage system 112 can be audited in a way that the customer/tenant can trust it is not tampered with and can validate that within a reasonable amount of time the third party has destroyed their access. By doing this, a customer can revoke the key they own in the HSM and the third party can no longer access their data.

As shown in FIG. 3, a tenant may trigger a key roll or key update at any time, as indicated at block 316. When this occurs, the storage controller will generate a new farm key and request that the master key storage system encrypt the newly generated farm key. All lower keys in the hierarchy can then also be re-wrapped.

Figure 4:
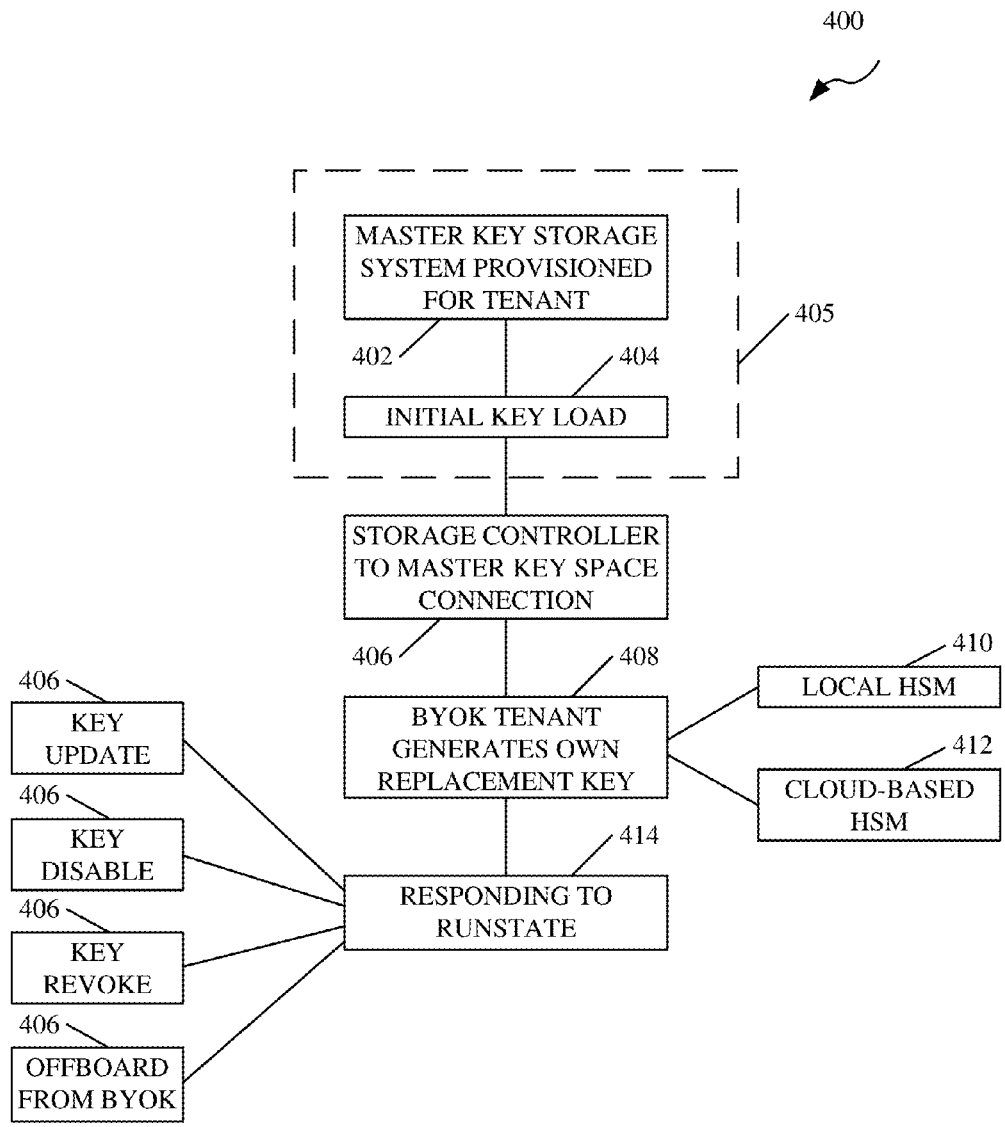
FIG. 4 is a flow diagram of a method of configuring keys for a remote data storage system in accordance with one embodiment.

FIG. 4 is a flow diagram of a method of configuring keys for a remote data storage system in accordance with one embodiment. Method 400 begins at block 402 where the master key storage system is provisioned for the tenant. In one example, such provisioning is performed using a semi-manual assistance process, such as a white glove process. Whether the master key storage system is on the tenant's premises or located in the cloud, this process will guide the tenant in properly setting up and configuring the master key storage system. Next, at block 404, the tenant's master key is loaded into the provisioned master key storage system. Again, block 404 is also, in one embodiment, executed as part of a white glove, semi-manual process as indicated by phantom block 405. Once the tenant's key is loaded into the provisioned master key storage system, a connection between the storage controller (such as system 104) and the master key storage system is created, as indicated at block 406. Once block 406 has completed, the system is ready to respond to data requests.

In the event that the tenant loses the master key (i.e. it is compromised or corrupted in one way or another) the tenant be able to generate a new key without additional assistance, as indicated at block 408. This may be so regardless of whether the master key storage system uses a local HSM 410 or a cloud-based HSM 412. Specifically, if the tenant maintained their original certificate, they will be able to generate a new key that can be used to decrypt the data after their previous key was revoked and replenish the HSM 410 or 412 with a working key after the revocation period has passed.

FIG. 4 also shows that the master key management system can respond to certain runstate events as indicated at block 414. Examples of such runstate events include a key update 416, a key disable event 418, and a key revoke event 420. Additionally, if the tenant wishes to offboard from the "bring-your-own-key" system, the master key storage system can accommodate such event as indicated at block 422.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
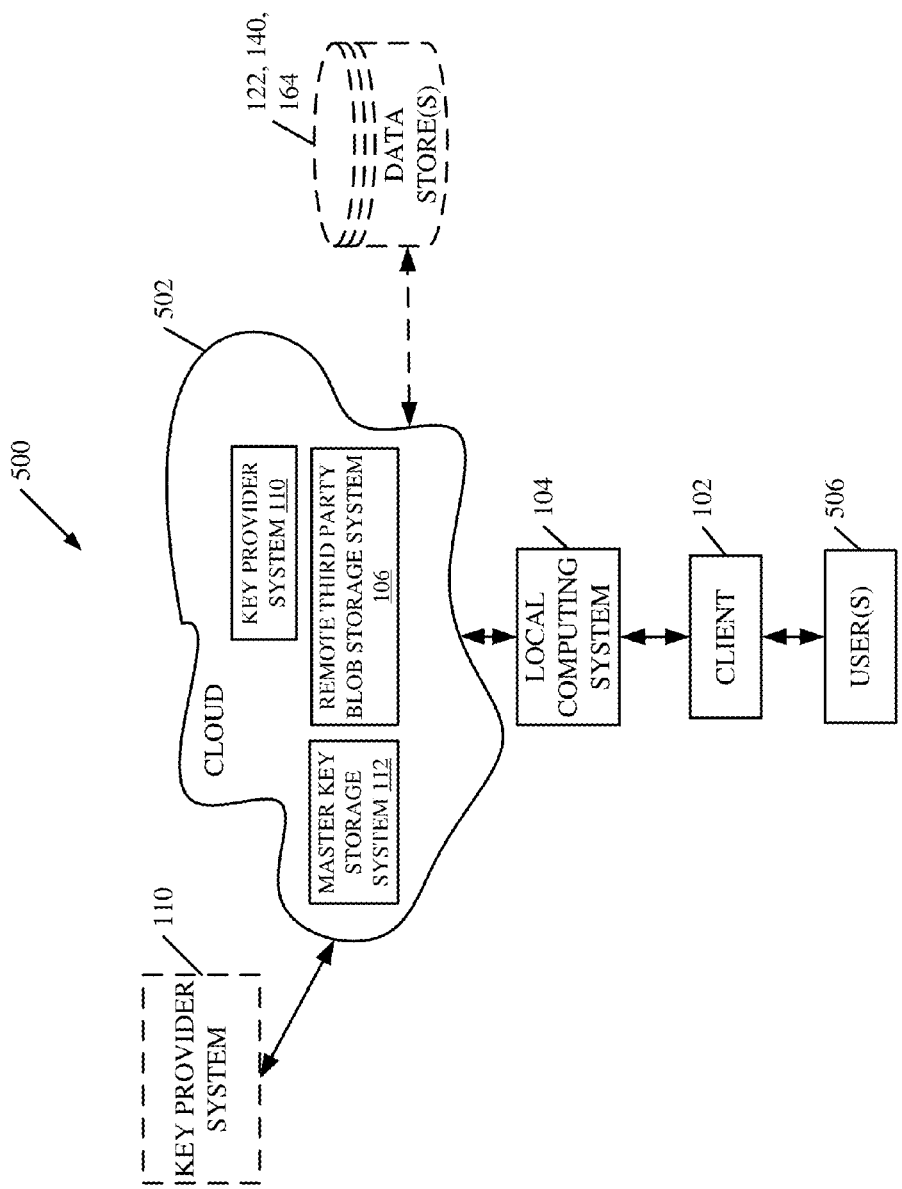
FIG. 5 is a block diagram of one example of the architecture shown in FIG. 1, deployed in a cloud computing architecture.

FIG. 5 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 5, some items are similar to those shown in FIG. 1 and they are similarly numbered. FIG. 5 specifically shows that systems 106, 110 and 112 can be located in cloud 502 (which can be public, private, or a combination where portions are public while others are private). Therefore, user(s) 506 use a client system 102 and local computing system 104 to access those systems through cloud 502.

FIG. 5 also depicts another example of a cloud architecture. FIG. 5 shows that it is also contemplated that some elements of architecture 100 are disposed in cloud 502 while others are not. By way of example, data stores 122, 140 and 164 can be disposed outside of cloud 502, and accessed through cloud 502. In another example, key provider system 110 (or other systems) can be outside of cloud 502. Regardless of where they are located, they can be accessed directly by system 104, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 7:
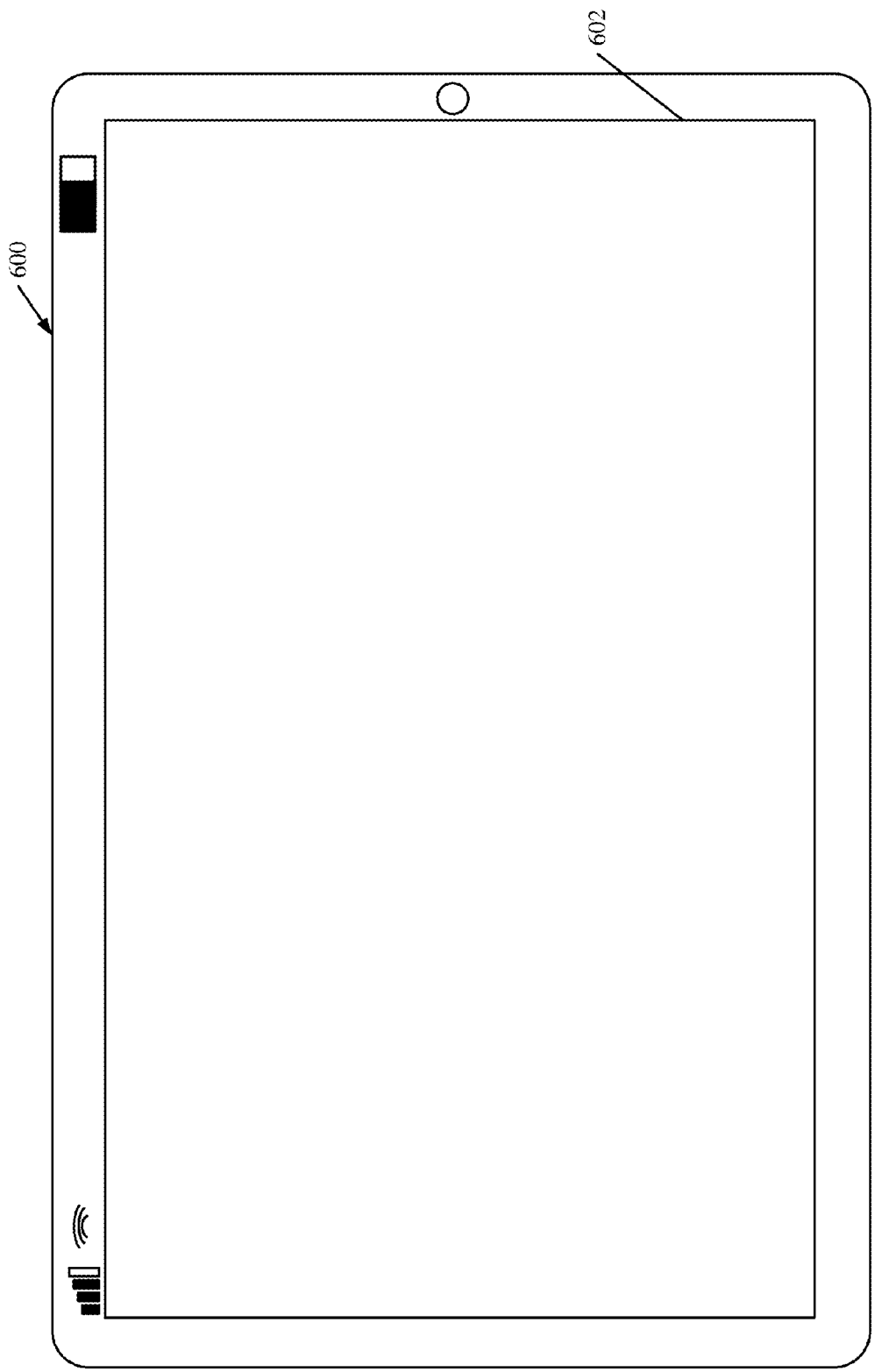
Figure 8:
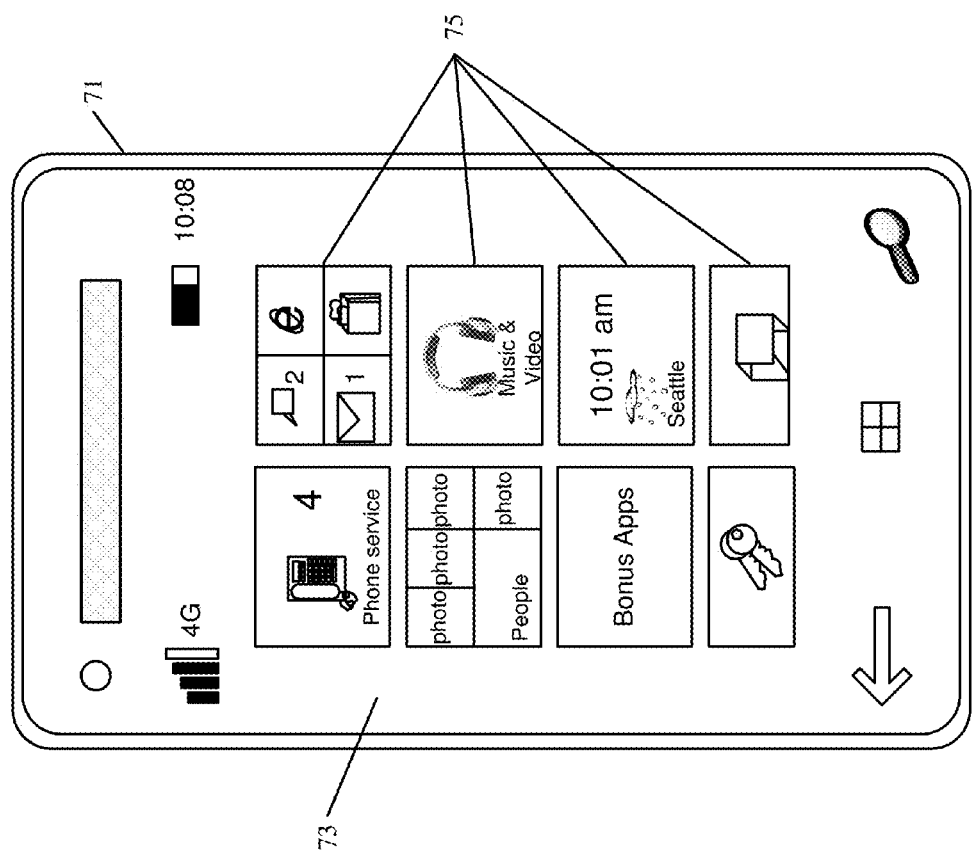
Figure 9:
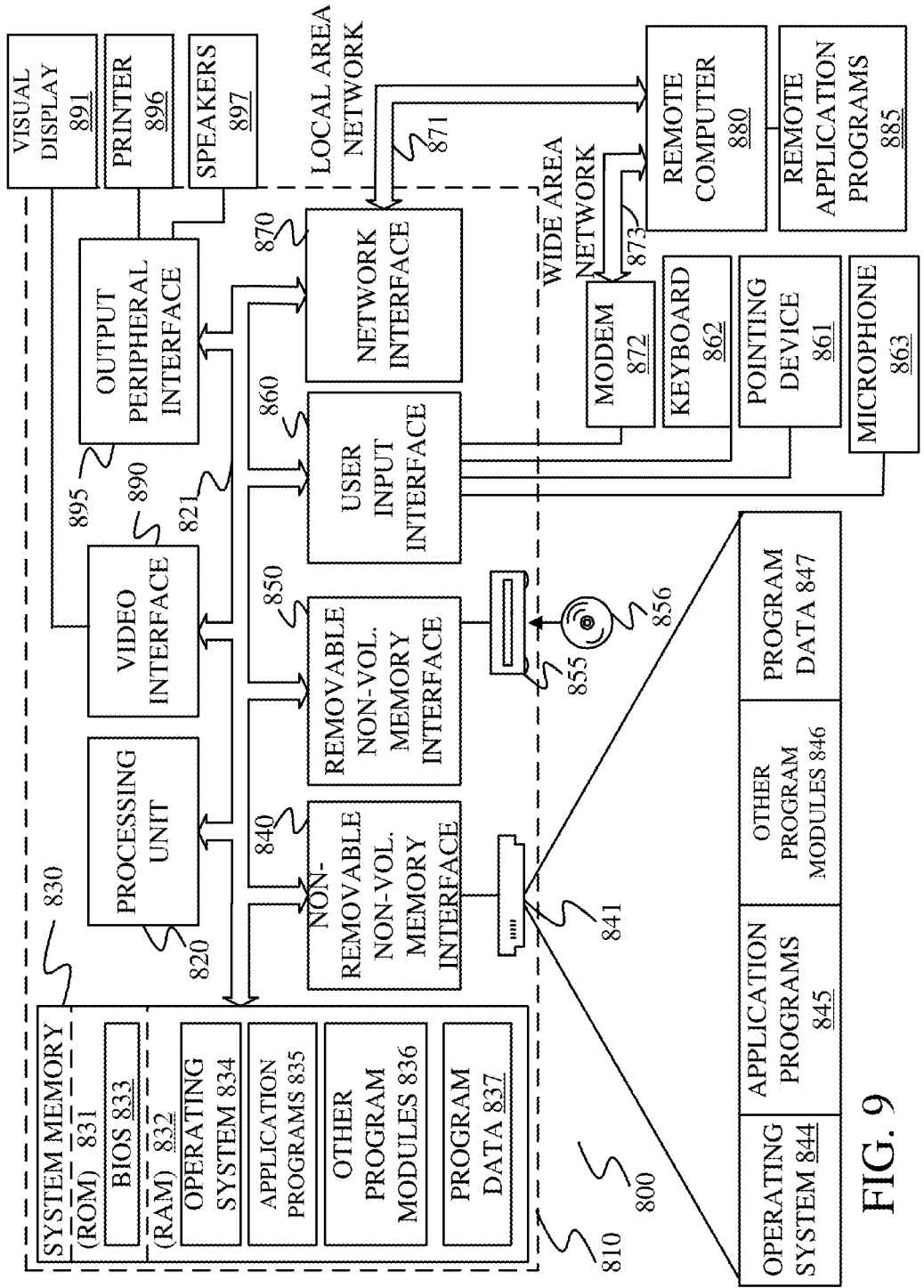
FIG. 9 is a block diagram of one example of a computing environment that can be used in any of the architectures shown in the previous figures.

FIG. 7 is a simplified block diagram of one illustrative example of a handheld or mobile computing device that can be used as a user's or client's hand held device 16, in which the present system (or parts of it) can be deployed. FIGS. 8-9 are examples of handheld or mobile devices.

Figure 6:
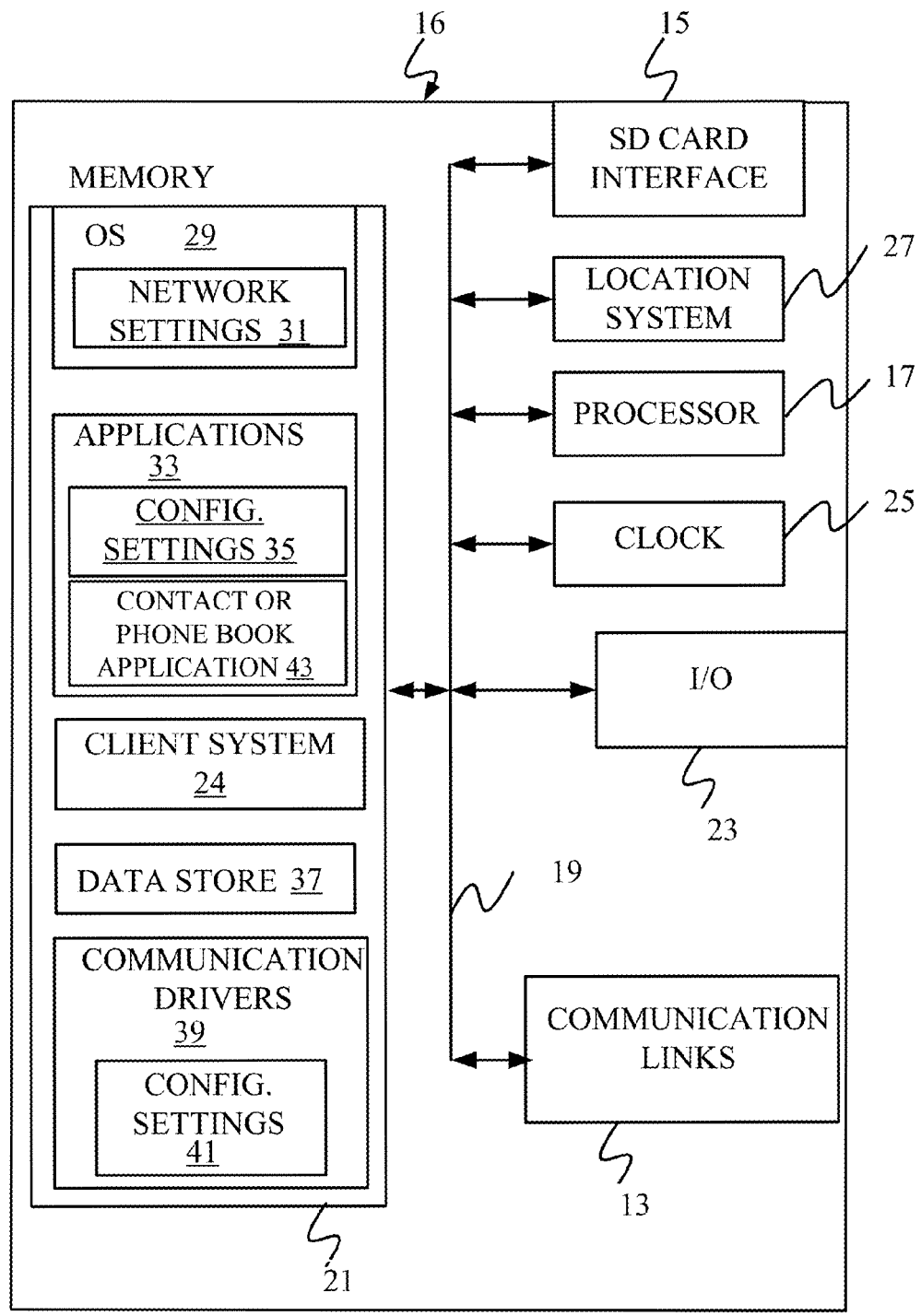
FIGS. 6-8 show examples of mobile devices that can be used in any of the architectures of the previous figures.

FIG. 6 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors 120, 150, 160 or 172 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various business applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 7 shows one example in which device 16 is a tablet computer 600. In FIG. 7, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 can be used as well. Device 16 can be, a feature phone, smart phone or mobile phone. The phone can include a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1xrtt, and Short Message Service (SMS) signals. In some examples the phone also includes a Secure Digital (SD) card slot that accepts a SD card.

The mobile device can also be a personal digital assistant or a multimedia player or a tablet computing device, etc. (hereinafter referred to as a PDA). The PDA can include an inductive screen that senses the position of a stylus (or other pointers, such as a user's finger) when the stylus is positioned over the screen. This allows the user to select, highlight, and move items on the screen as well as draw and write. The PDA can also include a number of user input keys or buttons which allow the user to scroll through menu options or other display options which are displayed on the display, and allow the user to change applications or select user input functions, without contacting the display. The PDA can also include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 8 shows that the phone can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

FIG. 9 is one example of a computing environment in which architecture 100, or parts of it, (for example) can be deployed. With reference to FIG. 9, an example system for implementing some embodiments includes a general-purpose computing device in the form of a computer 810. Components of computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 9 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 9 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a system for remotely storing data includes a communication component that is configured to receive a data file to be stored on a remote data storage system. An encryption system is configured to obtain at least one key and encrypt the data file with the at least one key. A processor is configured to generate a request to a master key storage system through the communication component to operatively encrypt the at least one key using a master key stored in the master key storage system. The communication component is configured to transmit the encrypted data file to at least one remote storage location. The processor is configured to receive the encrypted key(s) from the master key storage system and store the encrypted key(s) in a data store.

Example 2 is the system of any or all previous examples and further comprising a splitting component configured to split the data file into a plurality of blob portions, and wherein the at least one key includes a plurality of keys, each key being used by the encryption system to encrypt a respective blob portion.

Example 3 is the system of any or all previous examples wherein the communication component is configured to transmit each blob portion to a different remote storage location.

Example 4 is the system of any or all previous examples wherein the master key is related to the plurality of keys through a key hierarchy.

Example 5 is the system of any or all previous examples wherein the key hierarchy includes a site key configured to encrypt and decrypt all keys of a specific site.

Example 6 is the system of any or all previous examples wherein the key hierarchy includes a farm key configured to encrypt and decrypt all site keys of a farm.

Example 7 is the system of any or all previous examples wherein the request to the master key storage system is to encrypt the farm key.

Example 8 is the system of any or all previous examples wherein the data file is a binary large object.

Example 9 is the system of any or all previous examples wherein the processor is configured to communicate with the master key storage system, using the communication component, to determine whether master key access has changed.

Example 10 is the system of any or all previous examples wherein the processor is configured to discard any in-memory representations of keys that have been operatively decrypted by the master key storage system if the master key access has been revoked.

Example 11 is the system of any or all previous examples wherein the processor is configured to discard any in-memory representations of keys that have been operatively decrypted by the master key storage system if the master key has changed.

Example 12 is the system of any or all previous examples wherein the processor is configured to periodically communicate with the master key storage system, using the communication component, and store a log of such communication.

Example 13 is the system of any or all previous examples wherein the processor is configured to generate and store an audit trail indicative of interactions between the system for remotely storing data and the master key storage system.

Example 14 is a computer-implemented method of providing data access. The method includes receiving a file for storage and obtaining at least one key for encrypting the file. The file is encrypted with the at least one key and transmitted to at least one storage location. A request to a remote master key storage system is generated to operatively encrypt the at least one key using a master key. At least one encrypted key is received from the master key storage system and stored.

Example 15 is the method of any or all previous examples wherein the request specifies an HSM containing the master key.

Example 16 is the method of any or all previous examples and further comprising periodically communicating with the master key storage system to determine is access to master key cryptographic functions.

Example 17 is the method of any or all previous examples and further comprising discarding in-memory representations of keys that have been operatively decrypted by the master key if access to master key cryptographic functions has been revoked.

Example 18 is the method of any or all previous examples and further comprising splitting the file into a plurality of blob portions, and obtaining a different key to encrypt each blob portion.

Example 19 is a method of configuring keys for a remote data storage system. The method includes provisioning a hardware security module for a tenant. A tenant master key is loaded into the provisioned hardware security module. A remote data storage controller is granted access to the master key in the hardware security module. An audit trail is generated based on interactions with the hardware security module.

Example 20 is the method of any or all previous examples and further comprising periodically cause the remote data storage controller to check the hardware security module for revocation of access to the tenant master key.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system for remotely storing data, the computing system comprising:
a processor; and
memory storing instructions executable by the processor, wherein the instructions, when executed, configure the computing system to:
receive a data file to be stored on a remote data storage system;
split the data file into a plurality of blob portions;
obtain a plurality of keys;
encrypt the data file with the plurality of keys, each blob portion of the data file being encrypted with a respective key in the plurality of keys;
transmit the encrypted data file to at least one remote storage location;
generate a request to a master key storage system to operatively encrypt the plurality of keys using a master key stored in the master key storage system, wherein the master key is related to the plurality of keys through a key hierarchy;
and
receive the encrypted plurality of keys from the master key storage system and store the encrypted plurality of keys in a data store associated with the computing system.

2. The system of claim 1, wherein each blob portion is transmitted to a different remote storage location.

3. The system of claim 1, wherein the key hierarchy includes a site key configured to encrypt and decrypt all keys of a specific site.

4. The system of claim 3, wherein the key hierarchy includes a farm key configured to encrypt and decrypt all site keys of a farm.

5. The system of claim 4, wherein the request w the master key storage system is to encrypt the farm key.

6. The system of claim 1, wherein the data file is a binary large object.

7. The system of claim 1, wherein the processor is configured to communicate with the master key storage system to determine whether master key access has changed.

8. The system of claim 7, wherein the processor is configured to discard any in-memory representations of keys that have been operatively decrypted by the master key storage system if the master key access has been revoked.

9. The system of claim 7, wherein the processor is configured to discard any in-memory representations of keys that have been operatively decrypted by the master key storage system if the master key has changed.

10. The system of claim 7, wherein the processor is configured to periodically communicate with the master key storage system and store a log of such communication.

11. The system of claim 1, wherein the processor is configured to generate and store an audit trail indicative of interactions between the system for remotely storing data and the master key storage system.

12. A computer-implemented method of providing data access, the method comprising:
receiving a file for storage;
obtaining at least one key for encrypting the file;
encrypting the file with the at least one key;
transmitting the encrypted file to a storage location;
generating a request to a remote master key storage system to operatively encrypt the at least one key using a master key associated with the master key storage system;
receiving at least one encrypted key from the master key storage system;
storing the encrypted at least one key;
receiving an indication of master key access from the master key storage system;
based on the indication of master key access, determining that access of the master key has changed; and
based on determining that access of the master key has changed, modifying storage of the encrypted at least one key.

13. The method of claim 12, wherein the request specifies a hardware security module (HSM) containing the master key.

14. The method of claim 12, and further comprising periodically communicating with the master key storage system to determine access to master key cryptographic functions.

15. The method of claim 14, and further comprising discarding in-memory representations of keys that have been operatively decrypted by the master key if access to master key cryptographic functions has been revoked.

16. The method of claim 12, and further comprising splitting the file into a plurality of blob portions, and obtaining a different key to encrypt each blob portion.

17. A system for remotely storing data, the system comprising:
a processor; and memory storing instructions executable by the processor, wherein the instructions, when executed, provide a communication component and an encryption system;

wherein the communication component is configured to receive a data file to be stored on a remote data storage system;

wherein the encryption system is configured to obtain at least one key and encrypt the data file with the at least one key;

the processor being configured to generate a request to a master key storage system through the communication component to operatively encrypt the at least one key using a master key stored in the master key storage system;

wherein the communication component is configured to transmit the encrypted data file to at least one remote storage location; and wherein the processor is configured to receive the encrypted at least one key from the master key storage system and store the encrypted at least one key in a data store, the processor further being configured to communicate with the master key storage system, using the communication component, to determine whether master key access has changed.

\* \* \* \* \*